United States Patent [19]

McCabe et al.

[11] 3,879,584

[45] Apr. 22, 1975

[54] TRAIN PULSE GENERATOR

[75] Inventors: Edward J. McCabe; Donald E. Westphal, both of Wellsboro, Pa.

[73] Assignee: Mek-Tronix Laboratories Corporation, Mansfield, Pa.

[22] Filed: Sept. 17, 1973

[21] Appl. No.: 397,782

Related U.S. Application Data

[63] Continuation-in-part of Ser. No. 337,190, March 1, 1973.

[52] U.S. Cl. .............................................. 179/90 K

[51] Int. Cl. ............................................ H04m 1/30

[58] Field of Search ... 179/90 R, 90 B, 90 K, 90 BB

[56] References Cited

UNITED STATES PATENTS

| | | | |
|---|---|---|---|
| 3,601,552 | 8/1971 | Barnaby | 179/90 B |
| 3,718,771 | 2/1973 | Bank | 179/90 B |
| 3,732,439 | 5/1973 | Calvin | 179/90 R |
| 3,761,640 | 9/1973 | Monin | 179/90 R |
| 3,787,639 | 1/1974 | Battrick | 179/90 R |

*Primary Examiner*—Kathleen H. Claffy
*Assistant Examiner*—Gerald L. Brigance
*Attorney, Agent, or Firm*—Anthony A. O'Brien

[57] ABSTRACT

A train pulse generator has a memory for receiving and storing representations of numbers generated by the selective operation of a plurality of push button switches in accordance with selected numbers. Facilities, activated by the operation of any of the push button switches, operate the memory means to store the representations of the numbers in the memory. Other facilities sequentially apply representations of the stored representations to a register to activate a pulse generating oscillator which produces a train of pulses relating to a count of the register.

17 Claims, 3 Drawing Figures

TRAIN PULSE GENERATOR

CROSS-REFERENCE TO RELATED APPLICATION

This application is a continuation-in-part of our copending application, Ser. No. 337,190 filed Mar. 1, 1973, which is incorporated herein by reference.

BACKGROUND OF THE INVENTION

1. Field of the Invention

The invention relates to serial pulse generators, and in particular, to a generator for producing a plurality of sequential trains of pulses corresponding to sequentially operated push button switches in accordance with desired numbers, such as a push button telephone dial pulse generator.

2. Description of the Prior Art

Examples of prior art serial pulse generators are described in U.S. Pat. Nos. 3,456,085; 3,488,450, 3,601,552; and 3,614,331. Some of the prior art generators do not allow an operator to select another number until after all the pulses have been transmitted corresponding to the previously selected number. Other prior art serial pulse generators utilize complicated and expensive circuitry for generating trains of pulses.

SUMMARY OF THE INVENTION

The invention may be summarized in that an apparatus for generating trains of pulses corresponding to selected numbers includes a plurality of switches which may be selectively and sequentially operated in accordance with the selected numbers; memory means for receiving and storing representations of numbers therein; means, responsive to operation of any of the plurality of switches, for operating the memory means to store representations of the respective selected numbers in the memory means; a register; means for applying representations of the stored representations in the same order as stored in the memory, from the memory means to the register to produce related counts in the register; oscillator means for serially generating pulses; first control means for enabling the oscillator means in response to the application of a representation of a stored representation to the register and for disabling the oscillator means after a train of pulses relating to the count in the register have been generated; and second control means, responsive to the first control means disabling the oscillating means, for operating the applying means to apply a representation of a stored representation from the memory means to the register.

An object of the invention is to provide a relatively inexpensive and reliable serial pulse generator operated by push button switches.

Another object is to construct a push button dialer utilizing binary integrated circuitry.

One advantage of the invention is that succeeding numbers or digits can be selected by an operator without waiting for completion of the production of pulses corresponding to previously selected numbers.

Additional features of the invention include the provision of delay facilities responding to termination of a series of pulses for reading the next number from a memory; the provision of facilities for changing the count in a register until the register reaches a predetermined count to terminate serial pulse generation; the provision of control facilities for disabling a pulse generator when the count in a register is a predetermined count and for enabling the pulse generator when the count is other than the predetermined count; the provision of coincidence facilities sensing a coincidence of memory read addressing means with memory write addressing means to prevent generation of pulses until a new number has been stored in a memory.

Other objects, advantages and features of the present invention will become apparent from the following description of the preferred embodiments taken in conjunction with the accompanying drawings.

DESCRIPTION OF THE PREFERRED EMBODIMENT

Figure 1:
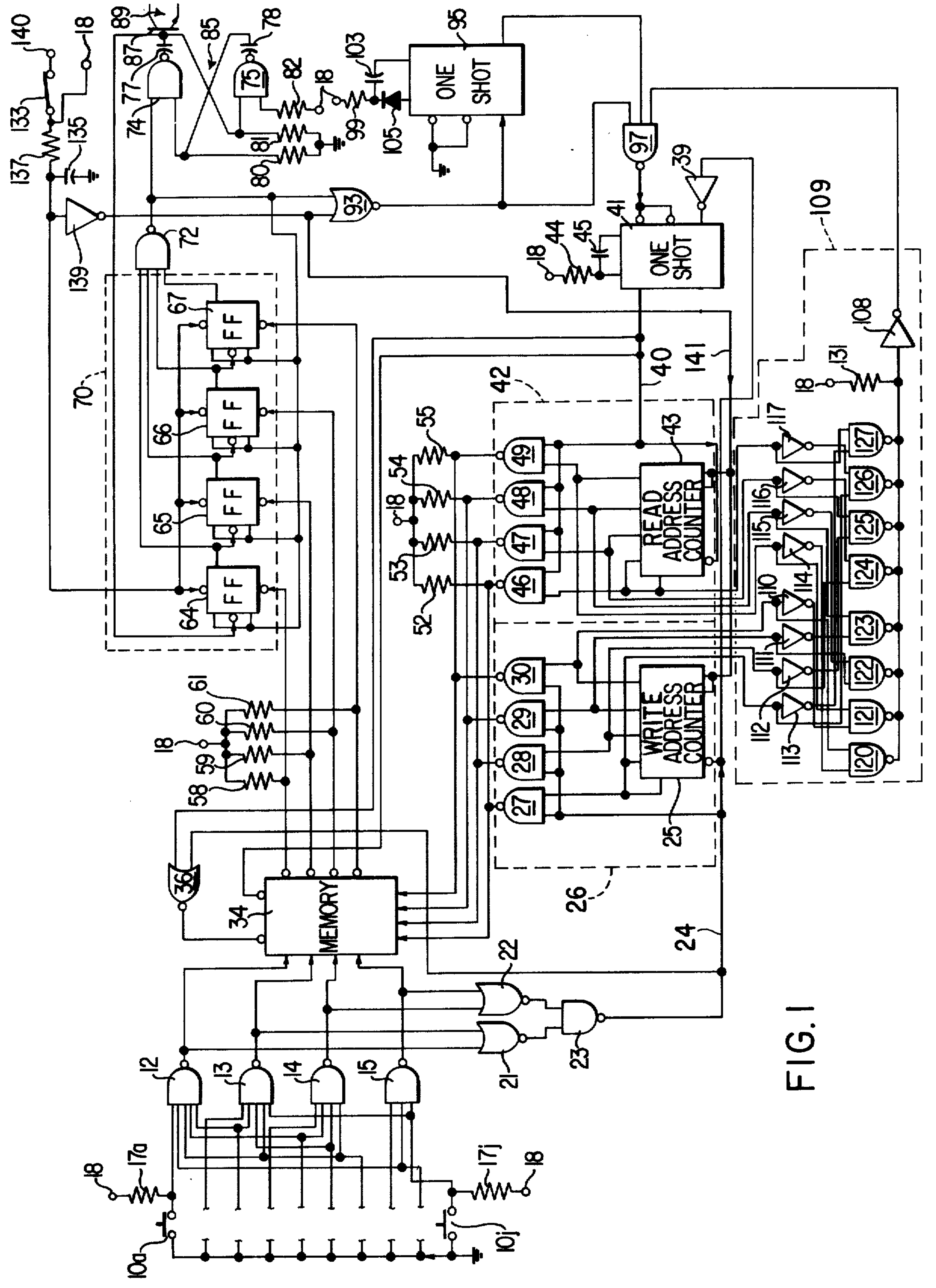
FIG. 1 is a diagram of an apparatus for generating trains of pulses in accordance with the invention.

As illustrated in FIG. 1, the invention is embodied in a telephone dial pulse generator including path button switches 10*a* through 10*j* (10*b* through 10*i* not shown) which are selectively and sequentially operated in accordance with selected characters or numbers to be dialed or pulsed in a telephone network. The characters, such as decimal digits, identify the number of serial pulses in pulse trains to be applied to the telephone network.

The switches 10*a* through 10*j*, normally open, are connected between ground and inputs of nand gates 12, 13, 14 and 15 in a binary encoding arrangement. The inputs of nand gates 12, 13, 14 and 15 are connected by resistors 17*a* through 17*j* (17*b* through 17*i* not shown) to a voltage terminal 18. The binary encoding arrangement is such that outputs of the nand gates 12, 13, 14 and 15 produce signals representing binary coded numbers which are the binary equivalent of the number of serial pulses to be pulsed by operation of the switches 10*a* through 10*j*. The outputs of nand gates 12, 13, 14 and 15 are connected to respective data inputs of a memory 34 and to respective inputs of nor gates 21 and 22 which have outputs connected to inputs of a nand gate 23 which produces a write signal whenever any of the push button switches 10*a* through 10*j* are operated. The output of the nand gate 23 is connected by a lead 24 to an input of a write address counter 25 in a write address circuit 26 such that the count in the counter 25 is advanced upon the termination or trailing edge of the write signal. The outputs of the counter 25 are connected to respective first inputs of nand gates 27, 28, 29 and 30 in the write address circuit 26, and the lead 24 from the nand gate is connected to second inputs of the nand gates 27, 28, 29 and 30 to apply sequential address signals on address inputs of the memory 34, connected to outputs of respective nand gates 27, 28, 29 and 30, during the write signal. Also, the lead 24 from the nand gate 23 is connected by a nor gate 36 to a memory enable input of the memory 34 to enable memory 34 to store successive representations of the binary coded numbers from the nand gates 12, 13, 14 and 15 in sequential discrete locations of the memory 34 selected by the address signals from the nand gates 27, 28, 29 and 30.

The output of the nand gate 23 is connected by the lead 24 and an inverter 39 to a one shot 41 such as to enable the one shot 41 to produce a read signal on its output in the absence of a write signal on line 24. A resistor 44 connected to the terminal 18 and a capacitor 45 form part of the circuitry of the one shot 41 to produce the read signal for a suitable short duration. The output of the one shot 41 is connected by a lead 40 to an input of a read address counter 43 in a read address circuit 42 to advance the read address counter 43 at the end of the read signal on line 40. The outputs of the read address counter 43 are connected to first inputs of nand gates 46, 47, 48 and 49 while the lead 40 is connected to second inputs of the gates 46, 47, 48 and 49 which have outputs connected to the address inputs of the memory 34. The output of the one shot 41 is also connected to an input of the nor gate 36 and a write-read mode input of the member 34 such that during the read signal, the memory 34 is in a read mode to produce signals on data outputs of the memory 34 representing the one's complement, or the inverse, of the binary coded number stored in the memory location selected by the address signals on the outputs of the nand gates 46, 47, 48, and 49 during a read signal from the one shot 41.

The memory circuit 34 is a read write or random access memory, having address inputs for selecting discrete memory locations, data inputs, data outputs, a memory enable input, and a write-read mode input. Integrated circuit memories, such as the single unit integrated circuits model number MCM4064 sold by Motorola, Inc. and model number SN 7489 sold by Texas Instruments, Inc. are suitable. Resistors 52, 53, 54 and 55 connected to the voltage terminal 18 provide bias for the address inputs of the memory 34 while resistors 58, 59, 60 and 61 connected to the terminal 18 provide bias to the outputs of the memory 34.

The data outputs of the memory 34 are connected to reset inputs of respective flip flops 64, 65, 66 and 67 interconnected as a register or binary counter 70 such that operation of the memory 34 in the read mode applies the one's complement or inverse of a stored binary coded number to the data outputs of the memory 34 and to the counter 70. Outputs of the flip flops 64, 65, 66 and 67 are connected to respective inputs of a nand gate 72 which has an output connected to disable J-K inputs of the flip flops 64, 65, 66 and 67 and to a nand gate 74 interconnected with a nand gate 75 by capacitors 77 and 78, resistors 80 and 81 to ground and resistor 82 to the terminal 18 as an astable multivibrator or oscillator indicated generally at 85. The capacitor 77 also connects the output of the nand gate 74 to the base of a transistor switch 87 connected in series with telephone lines indicated generally at 89 to generate dialing pulses on the telephone lines when the oscillator 85 is not disabled by a disable signal from the nand gate 72. The capacitor 77 is connected to an input of the flip flop 64 and the flip flops 64, 65 and 66 are interconnected such that the count of the counter 70 is advanced by pulses from the oscillator 85. The outputs of the flip flops 64, 65, 66 and 67 are connected to the nand gate 72 such that nand gate 72 produces a disable signal to disable the oscillator 85 when the counter 70 reaches a full count. The resistors 80, 81 and 82 and the capacitors 77 and 78 are selected to cause the oscillator 85 to produce pulses of a frequency and duration acceptable to a telephone switching network.

The output of the nand gate 72 is also connected through a nor gate 93 to an input of a one shot circuit 95 and a first input of a nand gate 97. The one shot 95, including a resistor 99 connected to the terminal 18, a capacitor 103 and a diode 105, has an output connected to a second input of the nand gate 97 to disable the nand gate 97 for a predetermined duration corresponding to the desired delay between successive trains of pulses produced on the lines 89. A third input to the nand gate 97 is connected to an output of an inverter 108 in a coincidence circuit 109 which also contains inverters 110, 111, 112, 113, 114, 115, 116 and 117 and nand gates 120, 121, 122, 123, 124, 125, 126 and 127. The outputs of the write address counter 25 are connected to first inputs of the respective nand gates 120, 122, 124 and 126; and the outputs of the read address counter 43 are connected to first inputs of the respective nand gates 121, 123, 125 and 127; while the inverters 110, 111, 112 and 113 connect the outputs of the write address counter 25 to second inputs of the respective nand gates 121, 123, 125 and 127; and the inverters 114, 115, 116 and 117 connect the outputs of the read address counter 43 to second inputs of the respective nand gates 120, 122, 124 and 126 to produce a coincidence signal on a common output connected to the input of the inverter 108 only if the count in the write address counter 25 is the same as the count in the read address counter 43 to disable the nand gate 97. The common output is biased by a resistor 131 connected to the terminal 18. The nand gate 97 is connected to inputs of the one shot 41 to operate the one shot 41 when both the nand gate 97 and the input of the one shot 41 from the inverter 39 are enabled to produce the read signal.

A conventional normally closed hook switch indicated generally at 133 is provided for disconnecting the terminal 18 from a voltage source 140 when a handheld telephone receiver (not shown) is positioned on a telephone instrument (not shown) when not being used. The switch 133, when closed by lifting the handheld receiver, connects the voltage source 140 to the terminal 18 and to a series resistor 137 and capacitor 135 connected to ground which have values selected to cause the charging of the capacitor 135 after a delay of from 2 to 7 milliseconds. The capacitor 135 is connected to set inputs of flip flops 64, 65, 66 and 67 for presetting the counter 70 to the full count during the delay. The capacitor 135 is connected by an inverter 139 and line 141 to reset inputs of the write address counter 25 and the read address counter 43 to reset the counters 25 and 43 to their zero counts. Also the inverter 139 is connected to a second input of the nor gate 93 to cause a delay in the reading of any numbers from the memory 34 for at least a predetermined duration selected to allow stabilization of the generator after the hook switch 133 has been closed.

The drawing illustrates circuitry by various symbols or blocks designed to perform various functions. Preferably, most of the circuitry is made from conventional integrated circuit units selected to perform one or more of the functions illustrated to produce a reliable and inexpensive dialing pulse generator which may be included within a telephone instrument or the like. As illustrated for the units 41 and 95, certain units require additional components, such as the resistors 44 and 99 and the capacitors 45 and 103 together with the grounding and biasing of various input terminals to perform a special function. The resistors 44 and 99 and the capacitors 45 and 103 together with the grounds, biases and connections shown are illustrative of typical components, biases, ground and connections recommended in integrated circuit unit manufacturers' specifications, and/or readily designed by one skilled in the art.

To initiate operation of the train pulse generator shown in FIG. 1, the handheld receiver is lifted to close the hook switch 133 and connect the voltage source 140 to the terminal 18 to activate the circuit. The initial low voltage on the capacitor 135 sets the flip flops 64, 65, 66 and 67 of the counter 70 to the full count and through the inverter 139 and line 141 resets the write address counter 25 and the read address counter 43 to their zero counts. Also during the charging of the capacitor 135 the one shot 95 is operated by a signal through nor gate 93 to produce a delay signal to disable the nand gate 97 and prevent the one shot 41 from producing a read signal for a predetermined duration.

To select a first desired number or digit, the operator depresses one of the push button switches 10*a* through 10*j* grounding respective positively biased inputs of the nand gates 12, 13, 14 and 15 to produce binary signals corresponding to a binary code of the selected number on the outputs of the nand gates 12, 13, 14 and 15. The binary signals operate one or both of the nor gates 21 and 22 to operate the nand gate 23 which produces a write signal on line 24 gating the nand gates 27, 28, 29 and 30 to produce write address signals on the outputs of nand gates 27, 28, 29 and 30 corresponding to a first memory location in the memory 34. The one shot 41 is held unoperated by the write signal on line 24 and inverter 39 to maintain the write-read mode input of the memory 34 in the write mode. Also the write signal is applied by the nor gate 36 to the enable input of the memory 34 to write and store the binary coded number on the output of the nand gates 12, 13, 14 and 15 into the first location in the memory 34. Upon release of the selected one of the push buttons 10*a* through 10*j*, the trailing edge of the write signal on line 24 advances the write address counter 25. Selection of succeeding numbers by selective and sequential operation of the push button switches 10*a* through 10*j* stores corresponding binary coded numbers in succeedingly addressed locations in the memory 34.

After the termination of the first write signal from the output of the nand gate 23 and after the delay signal from the one shot 95, the one shot 41 operates to produce a read signal on line 40 to gate nand gates 46, 47, 48 and 49 to apply read address signals of the first memory location to the address inputs of the memory 34. Also the read signal on the line 40 from the one shot 41 is applied to the write-read mode input and through the nor gate 36 to the memory enable input of the memory 34 to cause the memory 34 to apply the one's complement of the first binary coded number stored in the memory 34 to the flip flops 64, 65, 66 and 67 of the counter 70. When the one's complement of the first binary coded number is placed as a count in the counter 70, the nand gate 72 senses a non-full condition of the counter and produces an enables signal to enable the oscillator 85 to begin producing pulses on the telephone lines 89 and to enable the counter 70 to add a binary one to the binary count in the counter 70. Each successive pulse produced by the oscillator 85 is added to the count in the counter 70 until the counter 70 reaches a full count and the nand gate 72 produces a disable signal to disable the oscillator 85 and terminate the serial train of pulses on the lines 89. The number of pulses in the train correspond to the number selected by the operator. At the end of the read signal on line 40, the read address counter 43 is advanced.

The disable signal from the nand gate 72 through nor gate 93 enables the first input of the nand gate 97 and triggers the one shot 95 again to apply the delay signal to the second input of the nand gate 97 to disable the nand gate 97 for a duration at least equal to the desired duration between succeeding trains of pulses. The third input of the nand gate 97 will be disabled by a coincidence signal from the nand gates 120, 121, 122, 123, 125, 125, 126 and 127 in the coincidence circuit 109, if the write address on the outputs of the write address counter 25 is the same as the read address on the outputs of the read address counter 43 indicating that a second number has not been selected by the operator. When the nand gate 97 is again enabled and there is an absence of a write signal from the nand gate 23, the one shot 41 operates to again produce the read signal to cause the application of the one's complement of the binary coded number stored in the second location in the memory 34 to the counter 70 to produce a train of pulses on the telephone lines 89 corresponding to the second selected number. In a similar manner, the selection of succeeding numbers cause the generation of succeedig trains of pulses on the lines 89.

Figure 2:
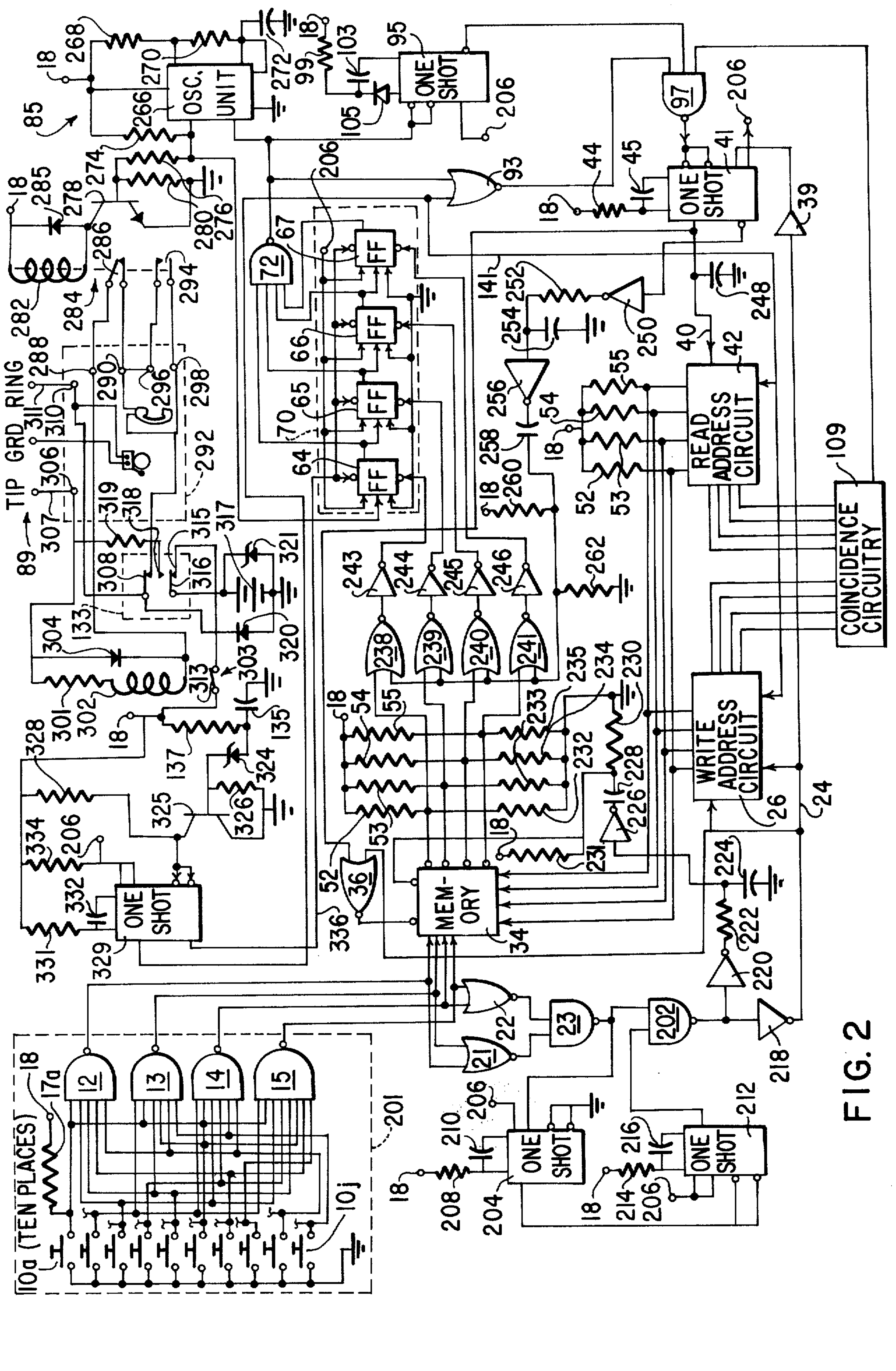
FIG. 2 is a diagram of a modified apparatus for generating trains of pulses in accordance with the invention.

A modified apparatus for generating trains of pulses is shown in FIG. 2. Certain parts of the circuitry shown in FIG. 2 are identified by the same numbers used for parts in FIG. 1 indicating that such commonly identified parts have similar structure and/or function. A switching and encoding network 201 includes the switches 10*a* through 10*j* connected to the nand gates 12, 13, 14, and 15 in a binary encoding arrangement which differs from the binary encoding arrangement of FIG. 1 in that the encoding arrangement of FIG. 2 is such that the nand gates 12, 13, 14 and 15 produce binary coded numbers which are the two's complements of the numbers selected by sequentially depressing the switches 10*a* through 10*j*.

The output of the nand gate 23 is connected to inputs of a nand gate 202 and a one shot 204 which typically includes a grounded input, a biasing input connected to a terminal 206, a resistor 208 connected to the terminal 18, and a capacitor 210 connected across a pair of terminals. The output of the one shot 204 is connected to inputs of a one shot 212 which includes a resistor 214 and a capacitor 216 along with biasing inputs such that the one shot 212 is triggered upon the trailing edge of an output pulse from the one shot 204. The duration of the pulse from the one shot 204 is selected to cover the initial period during which bouncing of contacts, non-uniform closure, etc., in the operation of the switches 10*a* through 10*j* cause irregularities in the signals from the nand gates 12, 13, 14 and 15. The output of the one shot 212 is connected to a second input of the nand gate 202 which has its output connected by an inverter 218 to the line 24 and by an inverter 220 to an integrating and delay circuit including a resistor 222 and a capacitor 224 connected to ground. The junction of the resistor 222 and the capacitor 224 is connected by an inverter 226 to a differentiating circuit including a series capacitor 228 and a resistor 230 connected to ground. The junction of the capacitor 228 and the resistor 230 is biased by a resistor 231 from the source 18 and is connected to the read-write mode input of the memory 34 to normally bias the memory 34 in the read mode. The capacitor 228 and the resistors 230 and 231 have values selected to place the memory 34 in the write mode for a short duration during a write signal from nand gate 202 to avoid erroneous writing of data in the memory 34 when the switches 10*a* through 10*j* are released.

The binary outputs of the memory 34 are connected to biasing junctions on voltage dividers including the respective resistors 52, 53, 54 and 55 and resistors 232, 233, 234 and 235. A gating circuit including or gates 238, 239, 240, 241 have inputs connected to the output of the memory circuit 34 while inverters 243, 244, 245 and 246 connect the output of the nor gates 238, 239, 240 and 241 to respective inputs of the flip flops 64, 65, 66 and 67 in the register or counter 70. The flip flops 64, 65, 66 and 67 in the embodiment of FIG. 2 are interconnected such that pulses from the oscillator circuit 85 to the flip flop 64 reduce the count in the counter 70 rather than advancing the count as in the embodiment of FIG. 1. This is accomplished by having succeeding flip flops 65, 66 and 67 triggered by the positive going edges of the outputs from the preceding stage rather than the negative going edges. Also, typical grounded inputs and bias inputs connected to terminal 206 are illustrated for the flip flops 64, 65, 66 and 67 of FIG. 2.

The positive going output of the one shot 41 connected to the nor gate 36 is also connected by a capacitor 248 to ground. A negative going output of the one shot 41 is connected to a strobing circuit which includes an inverter 250 connected to the negative going output of the one shot 41, a resistor 252 having one terminal connected to the output of the inverter 250, and a capacitor 254 connected between the other terminal of the resistor 252 and ground to form a delay and integrating circuit. An inverter 256 connected to the junction of the capacitor 254 and the resistor 252, and a capacitor 258 connected between the output of the inverter 256 and the junction of a voltage dividing network, including resistors 260 and 262 connected between the terminal 18 and ground, forms a differentiating circuit. The junction of the resistor 260 and 262 is connected to second inputs of the nor gates 238, 239, 240 and 241 to normally bias the nor gates inoperative.

The oscillating circuit 85 employs an integrated circuit unit 266 which has inputs connected to the terminal 18, to a resistor 268 connected to the terminal 18, to the junction of a resistor 270 and a capacitor 272 serially connected with the resistor 268 between the terminal 18 and ground, and to ground. The resistors 268 and 270 and the capacitor 272 along with the connections to the terminal 18 and ground are illustrative of typical connections which can be employed with commercially available integrated circuit units to form astable multivibrating or oscillating circuits. The output of the unit 266 is biased positive by a resistor 274 connected to the terminal 18 and is connected by a resistor 276 to the base of the transistor 278. An input resistor 280 is connected across the base and grounded emitter of the transistor 278 while the collector of the transistor 278 is connected to one terminal of a relay coil 282 which has its other end connected to the terminal 18. The coil 282 is part of a relay indicated generally at 284 which has normally closed dial pulsing contacts 286 connected to terminals 288 and 290 in a telephone circuit 292. Normally open contacts 294 of the relay 284 are connected to terminals 296 and 298 which are connected in parallel with the receiver in the telephone circuit 292 across the terminal 290 and normally closed contacts 308 of a hook switch 133 in series with terminal 310 and conductor 311 of the telephone lines 89. A series combination of a resistor 301 and a relay coil 302 of a relay, indicated generally at 303, and a diode 304 across the resistor 301 and coil 302 are connected in series with a normally closed contact 315 and a contact arm 316 of the hook switch 133 to a positive terminal of a battery 317 to supply voltage to the terminal 18 connected to the contacts 313. The resistor 301 and the relay coil 302 have impedance values which are sufficiently small not to interfere with audio signals to the receiver. The diode 304 has a polarity across the resistor 301 and the coil 302 such that they are shunted during the dialing period until the called party answers and the polarity of the voltage on conductors 307 and 311 reverses.

The battery 317, when the receiver is replaced operating the hook switch 133, is connected through the contact arm 136, a normally open contact 318 and a resistor 319 to the conductor 307 of the telephone lines. A diode 320 connected to ground and the negative terminal of the battery 317 is connected to the conductor 311 of the telephone lines to complete a charging path of the battery 317 when the telephone is not being operated. A Zener diode 321 is connected across the battery 317 to protect the battery against voltage surges.

The junction of the resistor 137 and the capacitor 135 are connected by a Zener diode 324 to the base of a transistor 325 which has a resistor 326 connected across the base and the grounded emitter of the transistor 325. The collector of the transistor 325 is connected by a resistor 328 to the terminal 18 and is connected to inputs of a one shot 329 which has a resistor 331 connected to the terminal 18, and a capacitor 332. Inputs of the one shot 329 are connected to the bias terminal 206 which receives its bias potential through a resistor 334 from the terminal 18. Outputs of the one shot 329 are connected by a lead 336 to reset inputs of the flip flops 64, 65, 66 and 67, and by the lead 141 to the reset inputs of the write address circuit 26, the read address circuit 42, and an input of the nor gate 93.

In operation of the modified dialing apparatus shown in FIG. 2, lifting the receiver from the hook switch 133 allows the contact arm 316 to move from engagement with the contact 318 disconnecting the line 307 through resistor 319 from the battery 317, and to engage the contact arm 316 with the contact 315 supplying voltage through normally closed contacts 313 of the relay 303 to the terminal 18 and through resistor 334 to terminal 206. After a delay determined by the charge time of the capacitor 135 through the resistor 137, the Zener diode 324 passes current to the transistor 325 which becomes conductive operating the one shot 329. The one shot 329 sets the counter 70 to its full count, resets the write address circuit 26, and resets the read address circuit 52 to the first discrete address location in the memory 34. Additionally, the nor gate 93 is operated to disable the nand gate 97 during the output pulse from the one shot 329.

When a digit of a telephone number is selected by depressing one of the switches 10*a* through 10*j*, the nand gates 12, 13, 14 and 15 produce a binary coded number which is the two's complement of the selected decimal digit. The binary coded number from gates 12, 13, 14 and 15 operates the nor gates 21 and 22 and the nand gate 23 to trigger the one shot 204 which after a duration of time triggers the one shot 212. The delay caused by the one shot 204 and 212 eliminates problems caused by bouncing of the switch contacts 10*a* through 10*j*. The output of the one shot 212 is gated with the signal from the nand gate 23 by the nand gate 202 and is applied through the inverter 218 to the line 24 operating the write address circuit 26 to apply the binary signals of the corresponding address location to the address inputs of the memory 34. Also the output signal from the nand gate 202 is applied through inverter 220 to the resistor 222 and the capacitor 224 which produce a delay in operating the inverter 226. The output of the inverter 226 is applied to the differentiating circuit of the capacitor 228 and the resistor 230 to produce a delayed strobe pulse to the write-read mode input of the memory 34 placing the memory 34 in the write mode during the strobe pulse. The delay caused by the capacitor 224 and the resistor 222 insures that the write address circuit 26 is stabilized before the binary coded number from the nand gates 12, 13, 14 and 15 is stored in the memory 34. The conversion of the write signal to a strobe pulse by the differentiating circuit avoids instability at the termination of the operation of the switches 10*a* through 10*j*.

Similarly, the delayed strobe pulse from the one shot 41 through the inverter 250, the resistor 252 to the capacitor 258 to resistors 260 and 262 operates the nor gates 238, 239, 240 and 241 to apply the one's complement of the stored binary numbers from the binary data outputs of the memory 34 to the counter 70 when the outputs of the read address circuit 42 are stabilized. The capacitor 248 across the positive going output of the one shot 41 serves to prevent noise or other induced signals from operating the read address circuit 42 and the memory 34.

When the oscillator 85 is triggered into an oscillating condition by the output of the nand gate 72 sensing a non-full count in the counter 70, the output of the oscillator unit 266 through the resistor 276, operates the transistor 278 to pulse the relay coil 282 opening and closing the contacts 286 to produce pulses over conductors 307 and 311 of the telephone lines 89. Also, the normally open contacts 294 are pulsed in synchronism with the contacts 286 to shunt the receiver and avoid loud audio pulses in the receiver. During the dialing period, the coil 302 and resistor 301 are shunted by the diode 304 which is rendered conductive by the polarity of the voltage on conductors 307 and 311.

The output of the oscillator unit 266 is applied to the counter 70 and causes the counter 70 to count backwards from the one's complement of the two's complement of the selected decimal digits until the full count of the counter 70 is reached. Thus, the corresponding number of pulses are produced on the telephone lines 89 equal to the number corresponding to the depressed switch.

After the telephone number has been dialed and the called party answers the telephone, the voltage polarity on the conductor 307 of the telephone lines 89 reverses, rendering the diode 304 non-conductive to pass current through the resistor 301 and the relay coil 302 operating the relay 303 opening the normally closed contact 313 which disconnects the dialing circuit from the battery 317 to conserve the power of the battery 317.

When the telephone is not in use and the hook switch 133 is operated by replacing the handheld receiver, the contact arm 316 engages the normally open contact 318 to pass a charging current through the resistor 319 from the conductor 306, the contact 318, the contact arm 316, the battery 317, the diode 320 to the conductor 311. The charging current maintains the battery 317 in its charged condition.

Figure 3:
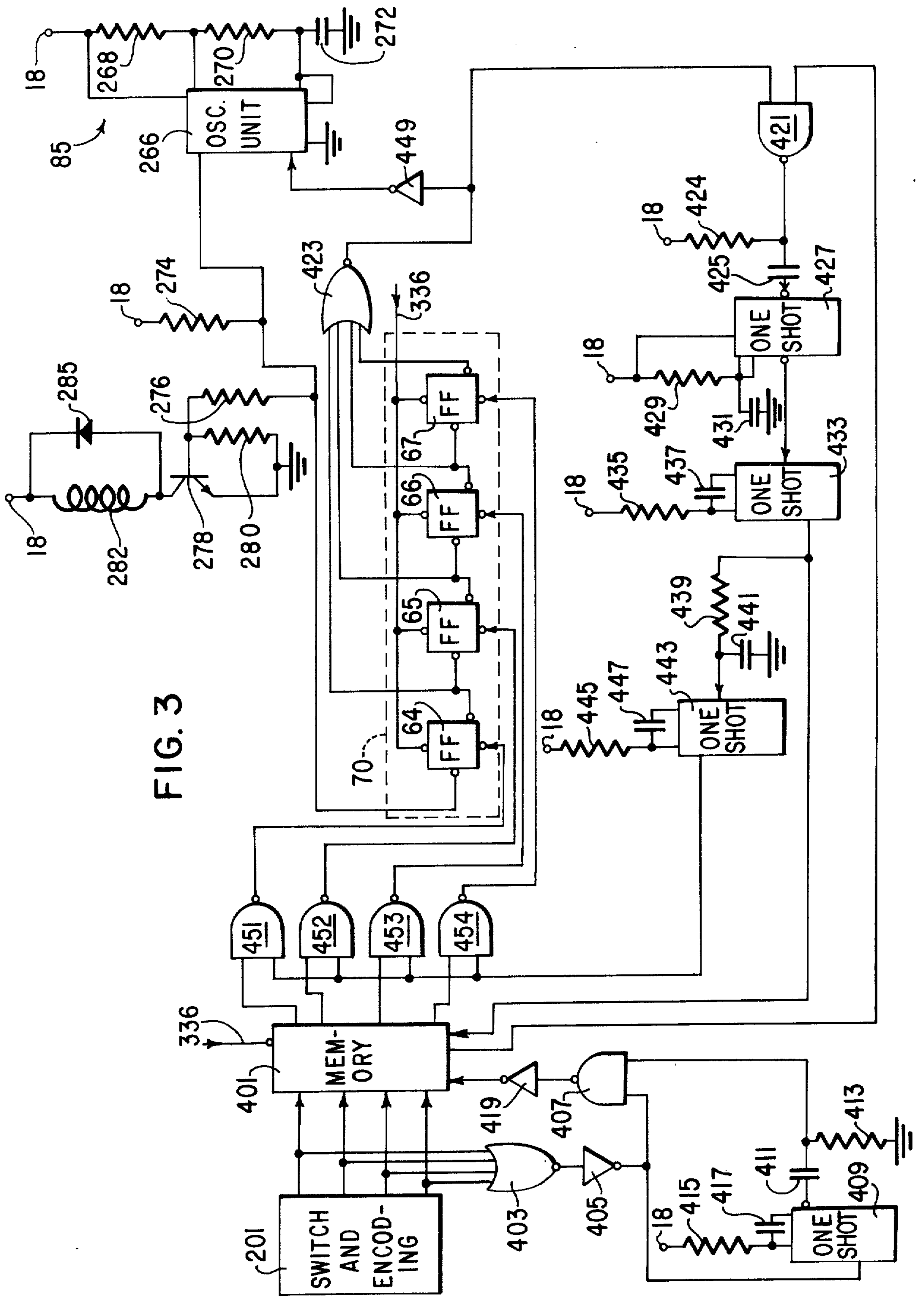
FIG. 3 is a diagram of another modified apparatus for generating trains of pulses in accordance with the invention.

Another variation of the train pulse generator is shown in FIG. 3 where some parts are identified with the same reference numbers used in FIGS. 1 and 2 to indicate that such parts have similar structure and for function. The generator shown in FIG. 3 includes a first-in first-out serial memory 401, such as integrated circuit Model No. 3341 sold by Fairchild Semiconductor division of Fairchild Camera and Instrument Corporation. The memory 401 differs from a shift register in that binary data written into the memory 401 from inputs is immediately shifted to the empty memory location nearest the output and is advanced to the next space whenever data is shifted out.

The outputs of the switching and encoding network 201 are connected to data input of the memory 401 and to inputs of a nor gate 403. The output of the nor gate 403 is connected by inverter 405 to respective inputs of a nand gate 407 and a one shot 409 which has an output connected through a differentiating circuit, including a capacitor 411 and a resistor 413 to ground, to a second input of the nand gate 407. The resistor 413 to ground normally biases the nand gate 407 inoperative to be operated only upon the trailing edge of the output pulse from the one shot 409. The one shot 409 includes a resistor 415 to the terminal 18 and a capacitor 417 which sets the duration of the output pulse from the one shot 409 greater than the period of irregular signals from bouncing contacts, etc. in the switching and encoding circuit 201. The output of the nand gate 407 is connected by an inverter 419 to a shift-in or write input of the memory 401.

An output-ready output of the memory 401 is connected to a first input of a nand gate 421 which has its second input connected to the output of a nor gate 423. The inverse outputs of the flip-flops 64, 65, 66 and 67 in the counter 70 are connected to inputs of the nor gate 423 to produce a disable signal when the inverse outputs of the counter have a zero count. The output of the nand gate 421, biased by a resistor 424 connected to the terminal 18, is connected by a capacitor 425 to an input of a one shot 427 which includes a resistor 429 connected to the terminal 18 and a capacitor 431 connected to ground such that the one shot 427 produces an output pulse or delay signal corresponding to the desired duration between successive trains of pulses.

The output of one shot 427 is connected to an input of a one shot 433 such that the one shot 433 is triggered at the trailing edge of the delay signal from the one shot 427. The one shot 433 includes a resistor 435 connected to the terminal 18 and a capacitor 437 connected across a pair of terminals to produce a pulse on an output of the one shot 433 connected to a shift-out input of the memory 401 to suitably read and shift out the first-in data remaining in the memory 401. The output of the one shot 433 is also connected by a delay circuit, including a resistor 439 and a capacitor 441 connected to ground, to an input of a one shot 443 which includes a resistor 445 connected to ther terminal 18 and a capacitor 447. The resistor 439 and the capacitor 441 have values selected to delay the operation of the one shot 443, which has an output connected to inputs of nand gates 451, 452, 453 and 454, such that the nand gates 451, 452, 453 and 454 are strobed after data signals on the outputs of the memory 401, connected to other inputs of the nand gates 451, 452, 453 and 454, have become stabilized during a pulse from the one shot 433. The nand gates 451, 452, 453 and 454 connect the outputs of the memory 401 to the reset inputs of flip-flops 64, 65, 66 and 67.

The output of the nor gate 423 is connected by an inverter 449 to an input of the oscillator unit 266 in the oscillator 85 such that the oscillator 85 is disabled during the disable signal from the nor gate 423 and enabled in the absence of the disable signal. The flip flops 64, 65, 66 and 67 are interconnected such that output pulses from the oscillator unit 266 advance the count in the counter 70. Also, the reset line 336 is connected to a master reset input of the memory 401 and to set inputs of the flip flops 64, 65, 66 and 67 such as to clear the memory 401 and to set the counter 70 to produce zero count on its inverse outputs.

In operation of the pulse generator shown in FIG. 3, initially the memory 401 is cleared and the counter is reset to its zero count by a reset signal on line 336 produces by lifting a handheld receiver. Selection of a decimal digit by operation of a switch in the network 201 applies a binary coded representation which is the two's complement of the selected decimal digit to the data inputs of the memory 401. The nand gate 403 is operated for applying a signal to one input of the nand gate 407 and to trigger the one shot 409 causing the differentiating capacitor 411 and resistor 413 to operate the nand gate 407 at the trailing edge of the output pulse from the one shot 409. Thus, the binary coded number from the switching and encoding circuit 201 is read into the memory 401 after the initial period when irregularities occur in the binary coded number. The differentiating capacitor 411 and resist or 413 only pass a short duration pulse to insure that any irregularities at the end of the operation of the switching and encoding circuit do not write erroneous data into the memory 401.

The first-in binary coded number immediately shifts to the location in the memory nearest the data outputs and causes the production of signals on the output-ready output of the memory. Subsequent binary coded numbers written into the memory 401 are shifted to sequential empty locations nearest the data outputs.

The output-ready signal operates the nand gate 421 which triggers the one shot 427 operating the one shot 433 after the dealy between trains of pulses. The one shot 433 applies a pulse ot the shift-out input of the memory 401 causing the generation of representations of the first-in stored binary coded number to be produced on the data outputs of the memory 401. After a brief delay, one shot 443 is operated to strobe the NAND gates 451, 452, 453, and 454 to apply the one's complement of the binary coded number from the memory 401 to the flip flops 64, 65, 66 and 67 in the counter 70. After the pulse from the one shot 433, the next-in binary coded number shifts to the location in the memory 401 nearest the data outputs.

The nor gate 423 senses a non-zero count on the inverse outputs of the counter 70 and enables the oscillator 85 to begin generating pulses which operate transistor 278 and dialing relay coil 282 in the manner previously described. The pulses from the oscillator 85 advance the count of the counter 70 until its count reaches zero causing the nor gate 423 to generate a disable signal terminating the generation of a dialing pulse train. Since the binary coded number is the two's complement of the selected decimal digit, the generator produces a corresponding number of pulses in the dialing pulse train.

The nand gate 421 is inoperative in the absence of the disable signal from the nor gate 423 such that the output-ready signal from the memory 401 cannot operate the nand gate 412. With the generation of the next disable signal, the nand gate 412 again operates to begin a delay between pulse trains and a subsequent read out and application of the next binary coded number to counter 70 generating the next pulse train. If the next number has not been selected, there will be an absence of the output ready signal on the output-ready output of the memory 401 to prevent the operation of the nand gate 421 until the next number has been selected and the output ready signal is again produced.

While the train pulse generator has been described as a dial pulse generator for a telephone system, the train pulse generator may be readily employed in any other system which utilizes variable trains of pulses corresponding to selected characters or numbers.

Since many variations, modifications, and changes in detail can be made to the described embodiments, it is intended that all matter contained in the foregoing description or shown in the accompanying drawings be interpreted as illustrative and not in a limiting sense.

What is claimed is:

1. An apparatus for generating trains of pulses corresponding to selected numbers comprising a plurality of switches having contacts which may be selectively and sequentially operated in accordance with the selected numbers;

memory means for receiving and storing representations of numbers therein;

means, responsive to operation of the contacts of any of the plurality of switches, for operating the memory means to store representations of the respective selected numbers in the memory means;

a register;

means for applying representations of the stored representations, in the same order as stored in the memory, from the memory means to the register to produce related counts in the register;

oscillator means for serially generating pulses;

first control means for enabling the oscillator means in response to the application of a representation of a stored representation to the register and for disabling the oscillator means after a train of pulses relating to the count in the register have been generated; and second control means, responsive to the first control means disabling the oscillating means, for operating the applying means to apply a representation of a stored representation from the memory means to the register, said means for operating the memory means including delay means for preventing the storing of the representations of the respective selected numbers in the memory means during an initial period of operation of the contacts during which the contacts are subject to irregular operation.

2. An apparatus as claimed in claim 1 wherein the first control means includes means for applying the pulses from the oscillator means to the register to change the count in the register;

means for disabling the oscillator means when the count in the register is a predetermined count and for enabling the oscillator means when the count in the register is other than the predetermined count.

3. An apparatus as claimed in claim 1 including delay means for delaying the operation of the second control means for a predetermined duration after the disabling of the oscillator means.

4. An apparatus as claimed in claim 1 wherein there is included encoding means for generating related binary coded representations of the selected numbers in response to the selective operation of the plurality of switches;

the memory means includes means for storing binary coded representations of numbers; and the register includes binary counting means for receiving a binary coded representations of a number to produce a corresponding binary count in the binary counting means.

5. An apparatus as claimed in claim 4 wherein the first control means includes means for applying the pulse from the oscillator means to the counting means to change the binary count of the counting means; and means, responsive to the binary count of the counting means having a predetermined value, for disabling the oscillator means and, responsive to the binary count of the counting means having other than the predetermined value, for enabling the oscillator means.

6. An apparatus for generating trains of pulses corresponding to selected numbers comprising a plurality of switches having contacts which may be selectively and sequentially operated in accordance with the selected numbers;

memory means having discrete locations for storing representations of numbers therein;

first addressing means, responsive to operation of the contacts of any of the plurality of switches, for addressing the memory means to store representations of the respective selected numbers in sequential discrete locations of the memory means;

a register;

second addressing means for sequentially applying representations of numbers from the sequential discrete locations of the memory means to the register to produce corresponding counts in the register;

oscillator means for serially generating pulses;

first control means for enabling the oscillator means in response to the application of a representation of a number to the register and for disabling the oscillator means after a train of pulses relating to the count in the register have been generated; and second control means, responsive to the first control means disabling the oscillating means, for operating the second addressing means to apply a representation of a number from the memory means to the register, said first addressing means including delay means for preventing the storing of the representations of the respective selected numbers in the memory means during an initial period of operation of the contacts during which the contacts are subject to irregular operation.

7. An apparatus as claimed in claim 6 and which includes coincidence means, operated in response to a coincidence of (a) the least discrete location in the memory in which a representation has been stored by the first addressing means with (b) the last discrete location in the memory from which a representation has been applied to the register by the second addressing means, for preventing operation of the second control means.

8. An apparatus as claimed in claim 6 wherein the first addressing means includes a first counter and means responsive to operation of any of the plurality of switches for stepping the first counter; and the second addressing means includes a second counter which is stepped by the second control means.

9. A telephone pulsing apparatus for generating trains of pulses corresponding to selected numbers on a telephone line comprising a plurality of manual switches having contacts which may be selectively and sequentially operated in accordance with the selected numbers, binary coding means connected to the contacts for producing binary coded numbers related to the selected number, a memory having a plurality of discrete storage locations, first addressing means operated when the contacts any of the switches is operated for storing the binary coded numbers in sequential discrete locations in the memory, said first addressing means including delay means for preventing the storing of the binary coded numbers in the memory during an initial period of operation of the contacts during which they are subject to irregular operation, a binary counter, second addressing means for sequentially applying binary coded representations of the binary coded numbers in the sequential discrete locations of the memory to the counter to produce related counts in the counter, oscillating means for serially generating pulses on the telephone line;

means for applying the pulses to the counter to change the count in the counter, first control means connected to the counter for applying a disable signal to the oscillating means when the count of the counter has a predetermined count to prevent the generation of pulses, delay means responsive to the initiation of a disable signal for producing a delay signal of predetermined duration, and second control means enabled only during the presence of the disable signal and the absence of the delay signal for operating the second addressing means to apply a binary coded representation to the counter.

10. A telephone pulsing apparatus as claimed in claim 9 and which includes coincidence means, sensing a coincidence of (a) the last discrete location in the memory in which a binary coded number has been stored by the first addressing means with (b) the last discrete location in the memory from which the second addressing means has applied a one's complement, for applying a hold signal to the second control means to prevent operation of the second control means until another binary coded number has been stored in another discrete location in the memory.

11. A telephone pulsing apparatus for generating trains of pulses corresponding to selected numbers on a telephone line comprising a plurality of push button switches which may be selectively and sequentially operated in accordance with the selected numbers;

a binary memory having (1) a plurality of discrete locations for storing binary coded numbers, (2) a plurality of binary inputs, (3) a plurality of binary outputs, (4) addressing inputs for selecting a discrete location, (5) write enabling means for storing a binary coded number from the binary inputs into the selected discrete locations and (6) read enabling means for producing a binary coded number from the selected discrete locations on the binary outputs;

binary encoding means operated by the switches for converting the selected numbers into related binary coded numbers and for applying the related binary coded numbers to the binary inputs of the memory;

a first counter;

first gating means connecting outputs of the first counter to the addressing inputs of the memory;

first control means, responsive to the operation of any of the switches, for operating the first gating means and the write enabling means and for stepping the first counter;

a second counter;

second gating means connecting outputs of the second counter to the addressing inputs of the memory;

a third counter;

means connected to the binary outputs of the memory for producing a counting in the third counter related to a binary coded number on the binary outputs of the memory;

oscillating means for serially generating pulses on the telephone line;

second control means for disabling the oscillating means when the count in the third counter is a predetermined count and for enabling the oscillating means when the count in the third counter is other than the predetermined count;

means for applying the pulses from the oscillating means to the third counter to change the count in the third counter; and third control means, responsive to the count in the third counter being equal to the predetermined count for a predetermined duration, for operating the second gating means and the read enabling means and for stepping the second counter, said first control means including first strobing means for operating the write enabling means only after a predetermined period of initial operation of a selected switch, said means connected to the binary outputs of the memory including third gating means connected between the binary outputs of the memory and inputs of the counter, and said third control means including second strobing means for operating the third gating means only after a predetermined initial period of operation of the third control means.

12. A telephone pulsing apparatus as claimed in claim 11 and which includes means, responsive to a coincidence of the count in the first counter with the count in the second counter, for disabling the third control means; and means, responsive to the first control means being operated, for disabling the third control means.

13. A telephone pulsing apparatus for generating trains of pulses corresponding to selected numbers on a telephone line comprising a plurality of switches which may be selectively and sequentially operated in accordance with the selected numbers;

a serial first-in first-out memory having (1) a plurality of parallel binary inputs, (2) a plurality of parallel binary outputs, (3) a plurality of memory locations, (4) means for shifting and storing parallel representations of binary coded numbers into the memory locations from the inputs and (5) means for applying binary coded representations of the first-in representations in parallel to the binary outputs and for shifting the first-in representations out of the memory;

binary encoding means operated by the switches for converting the selected numbers into related parallel binary coded representations and for applying the representations to the binary inputs of the memory;

first control means responsive to operation of any of the switches for operating the shifting and storing means of the memory;

a binary counter;

means connecting the binary outputs of the memory to the binary counter;

oscillating means for serially generating pulses on the telephone line;

second control means for disabling the oscillating means when the count in the counter is a predetermined count and for enabling the oscillating means when the count in the counter is other than the predetermined count;

means for applying the pulses from the oscillating means to the counter to change the count in the counter; and third control means, responsive to the count in the counter being equal to the predetermined count for a predetermined duration, for operating the applying and shifting out means of the memory to produce a count in the counter related to the first-in binary coded representation in the memory.

14. A telephone signaling apparatus for generating signals corresponding to selected numbers on a telephone line comprising a plurality of switches which may be selectively and sequentially operated in accordance with the selected numbers;

means responsive to operation of the switches for generating signals on the telephone line in accordance with the selected numbers;

switch means for connecting the generating means to a power source; and means responsive to a condition indicating that a called party has answered for opening the switch means.

15. A telephone signaling apparatus as claimed in claim 14 which includes receiver means, and wherein the switch means is responsive to a current condition through the receiver means.

16. A telephone signal apparatus as claimed in claim 15 wherein the switch means includes a diode for making the switch means responsive to a change in polarity of current through the receiver means.

17. A telephone signal apparatus as claimed in claim 15 wherein the generating means generates trains of pulses on the telephone line in accordance with the selected numbers;

there is included a rechargable battery;

the switch means connects the battery to the generating means; and there is included hook switch means for disabling the generating means and for applying a charging current to the battery from the telephone line.

* * * * *